Feb. 26, 1929.  
E. E. BORCK  
1,703,570  
GAS SAFETY VALVE  
Filed Sept. 22, 1927
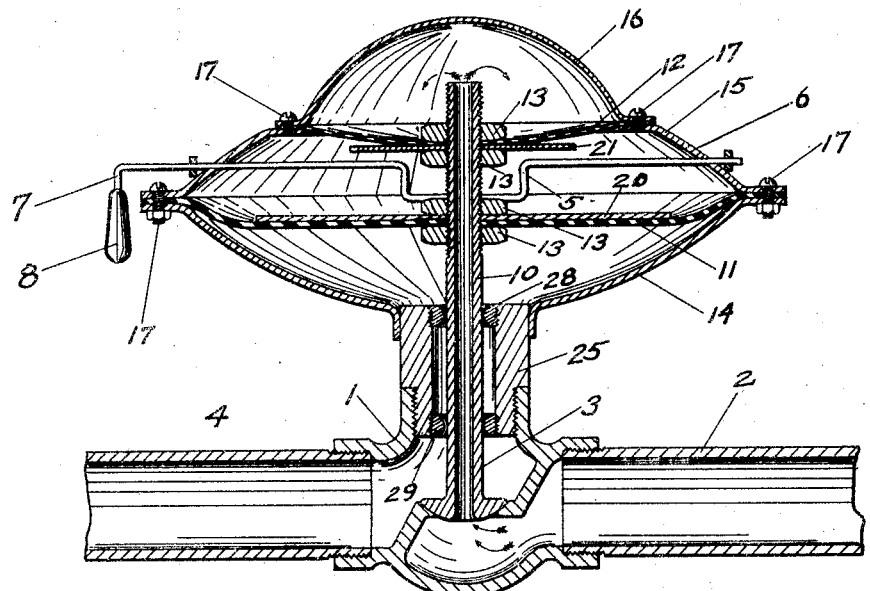
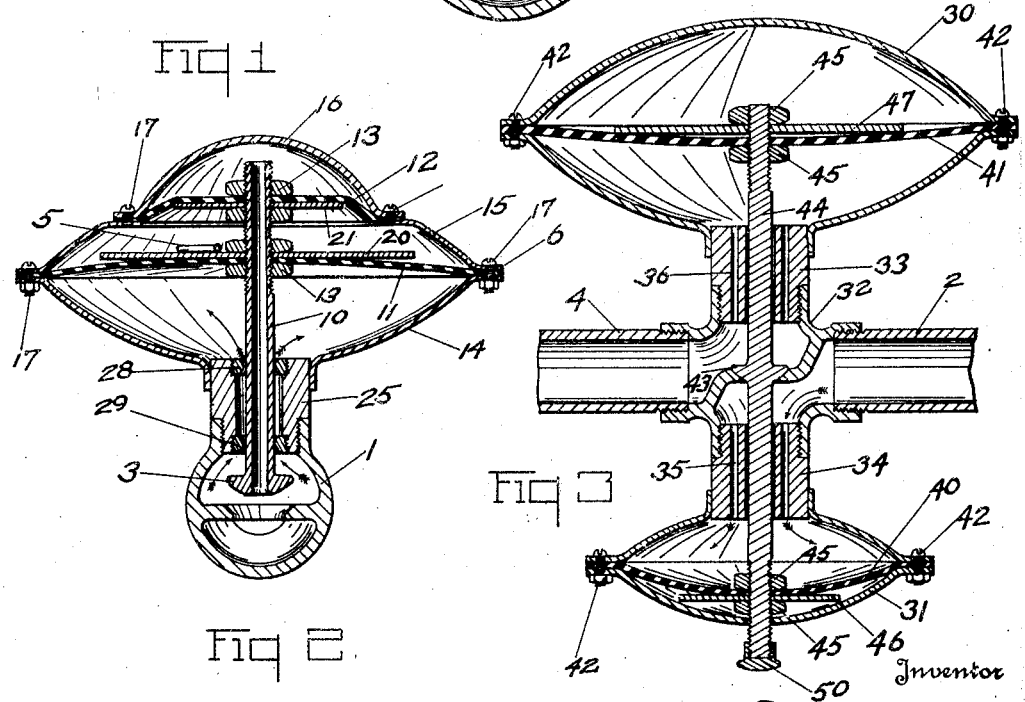
Inventor  
Edward E. Borck Patented Feb. 26, 1929.

1,703,570

UNITED STATES PATENT OFFICE.

EDWARD E. BORCK, OF MAUMEE, OHIO.

GAS SAFETY VALVE.

Application filed September 22, 1927. Serial No. 221,219.

My invention has for its object to provide an automatic valve which operates to close a pipe line when, for any reason, the pressure of the gas within the pipe line is reduced to such a degree as to practically discontinue for a short period of time the flow of gas. The invention has for its object to provide a means that will prevent flow of gas after it has been turned off, or where the pressure drops to such a degree that burners that may be supplied with the gas will become extinguished and until there has been some manual manipulation to restore the connection. This affords a gas safety device under the assumption that the one that restores the connection will have full knowledge of whether there are any gas burners in operation at the time that the pressure of the gas has been reduced and will ordinarily re-light any of such burners, or determine whether any burner requires relighting.

The invention may be contained in valve structures of different forms and, to illustrate a practical application of the invention, I have selected two forms of valves containing the invention as examples of the different structures embodying the invention. The structure referred to is shown in the accompanying drawings.

Fig. 1 is a vertical section through the valve. Fig. 2 is a section taken at right angles to the section shown in Fig. 1, the valve being shown in smaller proportionate dimensions than where the valve is shown in Fig. 1. Fig. 3 is a view of a section of a modified form of valve.

The valves shown in the drawings may be located at any point in a pipe line having burners or other apparatus that is to be protected from the escape of gas due to fall and rise of pressure in the line. In connection with pipe lines leading to houses where gas is used for domestic purposes, the automatic safety valve will be ordinarily located between the gas meter and the main pipe line and so as to shut off the gas from the house when the pressure of the pipe line falls to such a pressure as to cause burners to go out and thus prevent the escape of gas upon restoration of the gas pressure.

Thus the gas may enter the valve casing 1 through the pipe line 2 and when the movable valve member 3 is raised it will pass on through the pipe 4 and supply burners or other gas consuming devices. The valve member 3 is manually raised by the operation of a crank 5 that is located in a shell 6. The crank 5 may be formed from a bent rod 7 which is provided with a weighted handle 8 that is located in the same plane as the crank 5 and so that the weight of the handle 8 will normally cause the crank 5 to hang well away from the point that it engages to raise the valve member 3.

The stem 10 of the valve member 3 extends upward into a shell 6. The shell 6 is a three-part shell having two flexible diaphragms 11 and 12. The stem 10 is connected to the two diaphragms by means of clamping nuts 13 which are threaded onto the stem 10 and are located on opposite sides of the diaphragms 11 and 12. The edges of the diaphragms 11 and 12 are located one between the parts 14 and 15 of the shell 6 and the other between the parts 15 and 16 of the shell. The edges of the parts of the shell and the edges of the diaphragms are clamped together by suitable bolts 17. The diaphragms 11 and 12 are preferably formed of rubber or cloth impregnated with rubber and, in order to obtain a uniform distribution of the distension that may be produced by the gas pressure over the entire area of the rubber, the diaphragms may be backed by suitable discs 20 and 21 of more or less rigid material that cover major portions of the diaphragms.

The hollow stem 10 of the valve extends through a neck 25 that is threaded into the valve casing 1 and the shell 6 is connected to the end of the neck 25. Gas that passes through the valve may enter the neck 25 and pass into the lower portion of the shell 6 and beneath the diaphragm 11. The pressure of the gas upon the diaphragm 11 will maintain the valve 3 in its raised position and the gas continues to flow through the casing 1 and into the pipe 4 and supply the apparatus that is operated by or connected with the pipe 4. When, however, the pressure of the gas falls to a point such that the burners will become extinguished or gas otherwise fails to perform its function in any of the devices to which it is connected, the movable valve member 3 will, by reason of its weight and the weight of the parts connected thereto, descend and close the valve. If then the pressure of the gas should subsequently rise, the gas will pass upward through the hollow stem 10 of the valve into the upper portion of the shell 6 and to a point above the diaphragm 12. The pressure of the gas that is thus created on the diaphragm 12 will operate to hold the valve 3 closed and, because of the very much greater area of the diaphragm 12 than the area of the movable valve member 3, the valve member will be securely held against any movement by reason of the pressure on the lower side of the movable valve member. Since the gas is cut from the burners, the danger of leakage of gas through the burners is entirely eliminated. The supply of gas to the burners will be discontinued until the crank 5 is operated by means of the handle 8. The crank 5 will either engage the disc 21 or one of its clamping nuts upon rotation of the crank 5 and raise the valve member 3 from its seat. The gas will then enter the pipe 4 and create a pressure within the pipe 4. When the valve member 3 has been raised by the operation of the crank 5, the diaphragm 11 is also raised and the pressure of gas in the pipe 4 and in the lower portion of the shell 6 will cause the diaphragm 11 to hold the valve 3 in its raised position, notwithstanding its weight and the weight of the parts supported thereby and notwithstanding the pressure that may be exerted on the upper side of the diaphragm 12 which is transmitted through the hollow stem 10 of the valve 3. The diaphragm 12 is very much smaller than the diaphragm 11 and consequently the total pressure on the diaphragm 11 will be correspondingly greater than the total pressure on the diaphragm 12 and the valve member 3 will be maintained in its open position. The crank 5 may rest on the disc 20 and will return to its lowermost position by reason of the weighted handle 8 when the valve is closed.

In order to guide the stem 10 and allow for its free vertical movement, the ends of the neck 25 may be provided with rings 28 and 29 having rounded inner surfaces and located at the upper and lower ends of the interior of the neck 25 and substantially fitting the exterior of the stem 10 for guiding the stem in its vertical movements and yet permitting the gas to pass from the outlet side of the valve into the lower portion of the shell 6. The rod 7, from which the crank 5 is formed, extends through the part 15 located intermediate the two diaphragms 11 and 12. This chamber on the shell 6 does not communicate with either side of the gas valve and consequently is normally maintained at atmospheric pressure and so that there will be no leakage of the gas through the openings in which the end portions of the rod 7 are located.

In the form of construction shown in Fig. 3, a pair of shells 30 and 31 are connected to opposite sides of the valve casing 32 by means of the necks 33 and 34. The necks 33 and 34 have passage-ways 35 and 36 whereby gas may pass from the pipes 2 and 4 into the shells and exert their relative pressures on the diaphragms 40 and 41 that extend across the shells. The edges of the diaphragms 40 and 41 and the edges of the parts of the shells are secured together by means of the bolts 42. The movable valve member 43 is provided with a stem 44 that extends from opposite sides of the valve member 43 and the ends of the stem 44 are connected to the diaphragms 40 and 41 by means of the clamping nuts 45 located on opposite sides of the diaphragms 40 and 41. Preferably, the diaphragms are backed by suitable discs 46 and 47 that cover the major portion of the flexible diaphragms 40 and 41. The stem 44 extends through the shell 31 and is capped by a suitable cap 50. The cap on the end of the stem 44 may be pushed upward to open the valve member 43 and this will carry upward the central portions of both of the diaphragms 40 and 41. The pressure of the gas in the pipe 4 as transmitted through the neck 33 and operating on the larger diaphragm 41 will operate to maintain the movable valve member 43 in its open position. The gas will thus continue to flow through the valve casing 32. If, however, the pressure of the gas falls to substantially zero, the valve member 43 will close and, when the pressure rises again in the pipe 2, it will be transmitted through the neck 34 and operate upon the diaphragm 40 which will operate to maintain the valve member 43 closed, notwithstanding the pressure on its smaller area. When, therefore, the operator in charge of the burners desires to restore the connection with the gas supply, he will raise the stem 44 and open the gas valve 43. The gas valve will be maintained in its open position notwithstanding the pressure of the gas on the diaphragm 40 over to the much larger area of the diaphragm 41 which will produce correspondingly increased total pressure on the diaphragm 41 to maintain the valve 43 in its open position, notwithstanding its weight and notwithstanding the pressure on the diaphragm 40.

I claim:

1. In a gas valve construction, a movable gas valve member, a shell, a pair of flexible diaphragms forming chambers in the shell, a hollow stem connected to the movable gas valve member and to the diaphragms, one of the chambers communicating with the outlet side of the gas valve and the other of the chambers communicating with the inlet side of the gas valve through the stem.

2. In a gas valve construction, a movable gas valve member, a shell, a pair of flexible diaphragms forming chambers in the shell, a hollow stem connected to the movable gas valve member and to the diaphragms, one of the chambers communicating with the outlet side of the gas valve and the other of the chambers communicating with the inlet side of the gas valve through the stem, and means for manually operating the movable gas valve member, the diaphragms operating to maintain the gas valve member in its opened and in the closed positions.

In witness whereof I have hereunto signed my name to this specification.

EDWARD E. BORCK.